US010035450B2

(12) United States Patent
Nielsen et al.

(10) Patent No.: US 10,035,450 B2
(45) Date of Patent: Jul. 31, 2018

(54) MOBILE SERVICE MODULE, A METHOD FOR SERVICING A LARGE MECHANICAL AND/OR ELECTRICAL DEVICE AND USE OF A MOBILE SERVICE MODULE

(71) Applicant: YOUR GLOBAL SOLUTION APS, Videbæk (DK)

(72) Inventors: Lars Birkkjær Nielsen, Videbæk (DK); Kasper Lyhne Hansen, Herning (DK)

(73) Assignee: YOUR GLOBAL SOLUTION APS, Herning (DE)

( * ) Notice: Subject to any disclaimer, the term of this patent is extended or adjusted under 35 U.S.C. 154(b) by 0 days.

(21) Appl. No.: 15/312,605

(22) PCT Filed: Jun. 9, 2015

(86) PCT No.: PCT/DK2015/050153
§ 371 (c)(1),
(2) Date: Nov. 18, 2016

(87) PCT Pub. No.: WO2015/188830
PCT Pub. Date: Dec. 17, 2015

(65) Prior Publication Data
US 2017/0088032 A1 Mar. 30, 2017

(30) Foreign Application Priority Data

Jun. 9, 2014 (DK) .................................. 2014 00303

(51) Int. Cl.
*B60P 3/14* (2006.01)
*B60J 7/02* (2006.01)
(Continued)

(52) U.S. Cl.
CPC ................. *B60P 3/14* (2013.01); *B60J 7/026* (2013.01); *B62D 63/061* (2013.01); *F03D 9/002* (2013.01);
(Continued)

(58) Field of Classification Search
CPC ........... B60P 3/14; B62D 63/061; B60J 7/041
(Continued)

(56) References Cited

U.S. PATENT DOCUMENTS 3,308,845 A * 3/1967 Bellas ....................... B60P 3/14
137/234.6
3,342,523 A 9/1967 Lutgen
(Continued)

FOREIGN PATENT DOCUMENTS

CA 2755934 A1 4/2013
DE 1261050 B 2/1968
(Continued)

OTHER PUBLICATIONS

International Preliminary Report on Patentability, International Search Report and Written Opinion of PCT/DK2015/050153, dated Sep. 5, 2016, 10 pages.

*Primary Examiner* — Jason S Morrow
(74) *Attorney, Agent, or Firm* — Blank Rome LLP

(57) ABSTRACT

Disclosed is a mobile service module (1) for servicing a large mechanical and/or electrical device (2). The service module (1) comprises a first area (3) arranged to hold the large mechanical and/or electrical device (2), wherein the first area (3) is at least partly enclosed by a first roof part (4), a first left side part (5) and a first right side part (6). The service module (1) also comprises a second area (7) including servicing means (8) for servicing the large mechanical and/or electrical device (2) while located in the first area (3) and wherein the second area (7) is at least partly enclosed by a second roof part (9), a second left side part (10) and a second right side part (11). The service module (1) further comprises displacement means (13) for displacing the first roof part (4) and the first left side part (5) and/or the first right side part (6) into a position where the first roof part (4) and the first left side part (5) and/or the first right side part
(Continued)

Figure 5:
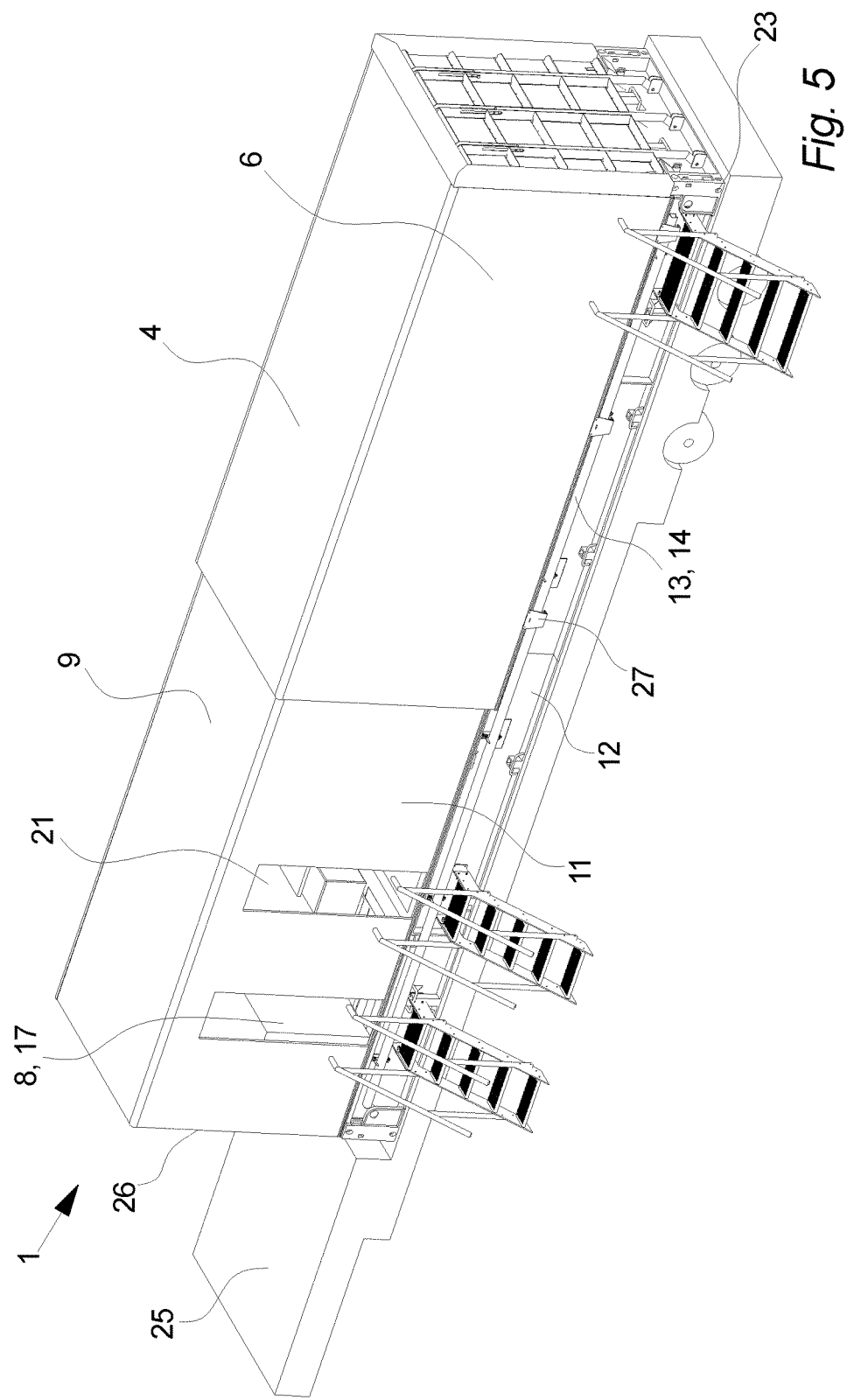

(6) substantially cover the second roof part (9), the second left side part (10) and/or the second right side part (11). A method for servicing a large mechanical and/or electrical device (2) having a normal place of operation above ground level and use of a mobile service module (1) is also disclosed.

19 Claims, 4 Drawing Sheets

(51) Int. Cl.
  *F03D 15/00* (2016.01)
  *F03D 80/50* (2016.01)
  *B62D 63/06* (2006.01)
  *F03D 9/00* (2016.01)

(52) U.S. Cl.
  CPC ............ *F03D 15/00* (2016.05); *F03D 80/50* (2016.05); *F05B 2230/80* (2013.01); *F05B 2260/40* (2013.01)

(58) Field of Classification Search
  USPC .................. 296/24.33, 24.32, 26.09, 100.03
  See application file for complete search history.

(56) References Cited

U.S. PATENT DOCUMENTS

| | | | | |
|---|---|---|---|---|
| 3,540,771 | A * | 11/1970 | Stoneburner | B60J 7/041 105/377.09 |
| 4,569,293 | A * | 2/1986 | Kramer | B61D 39/003 105/377.1 |
| 5,833,294 | A * | 11/1998 | Williams | B60P 3/14 296/24.32 |
| 5,864,991 | A * | 2/1999 | Burns | B05B 15/1214 296/26.09 |
| 6,017,082 | A * | 1/2000 | Leoni | B60J 7/02 296/100.03 |
| 6,059,349 | A * | 5/2000 | Doll | B60J 7/026 296/100.03 |
| 9,834,127 | B2 * | 12/2017 | Caulder | B60P 3/07 |
| 2010/0025398 | A1 | 2/2010 | Krohn | |
| 2011/0120026 | A1* | 5/2011 | Hache | B60P 3/14 52/79.5 |
| 2013/0292229 | A1* | 11/2013 | Davi | B60P 1/02 198/465.1 |

FOREIGN PATENT DOCUMENTS

| | | |
|---|---|---|
| DE | 3732599 A1 | 4/1989 |
| EP | 1777102 A1 | 4/2007 |
| EP | 2660101 A2 | 11/2013 |
| GB | 1029287 | 5/1966 |

* cited by examiner

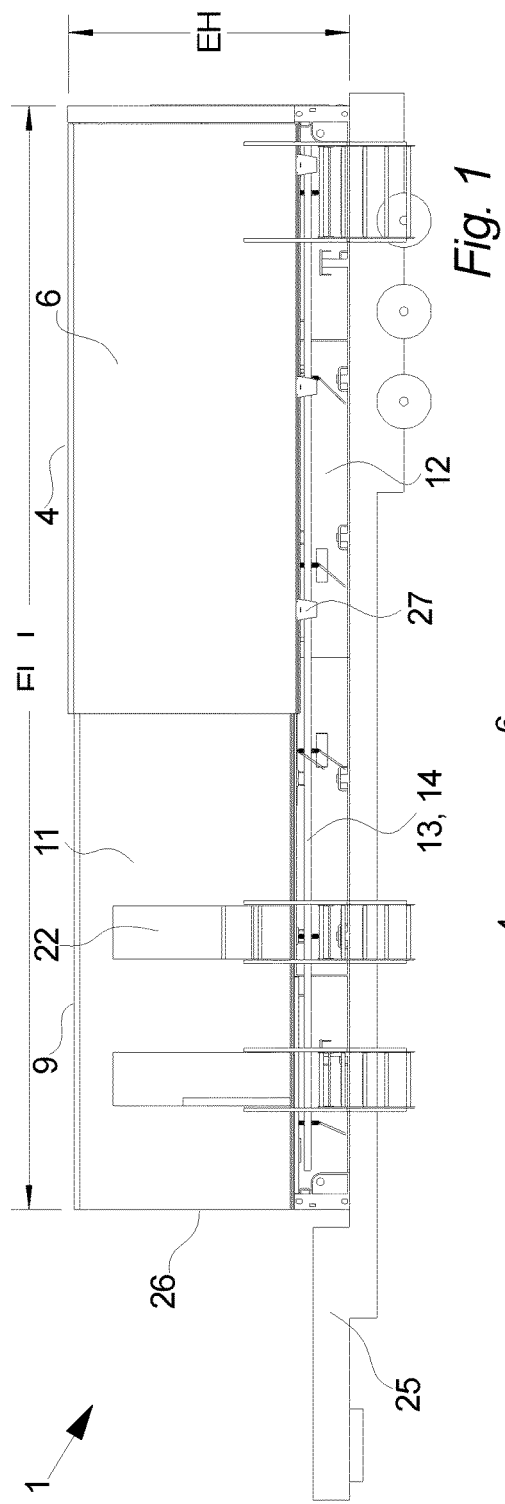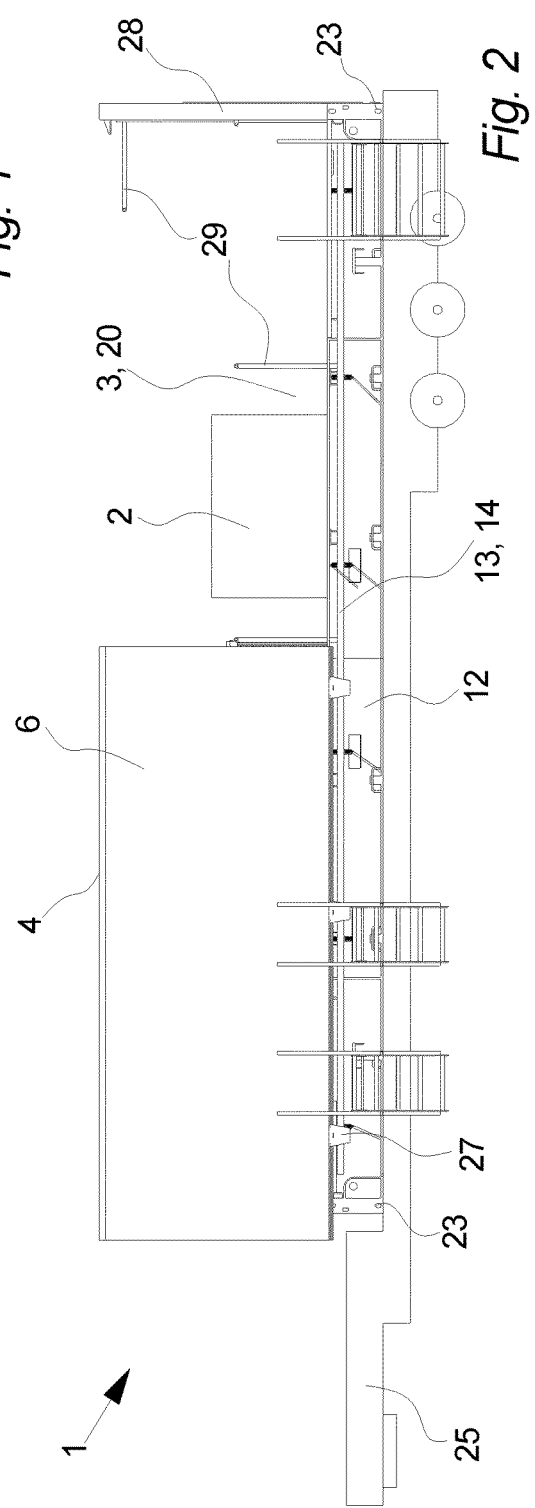

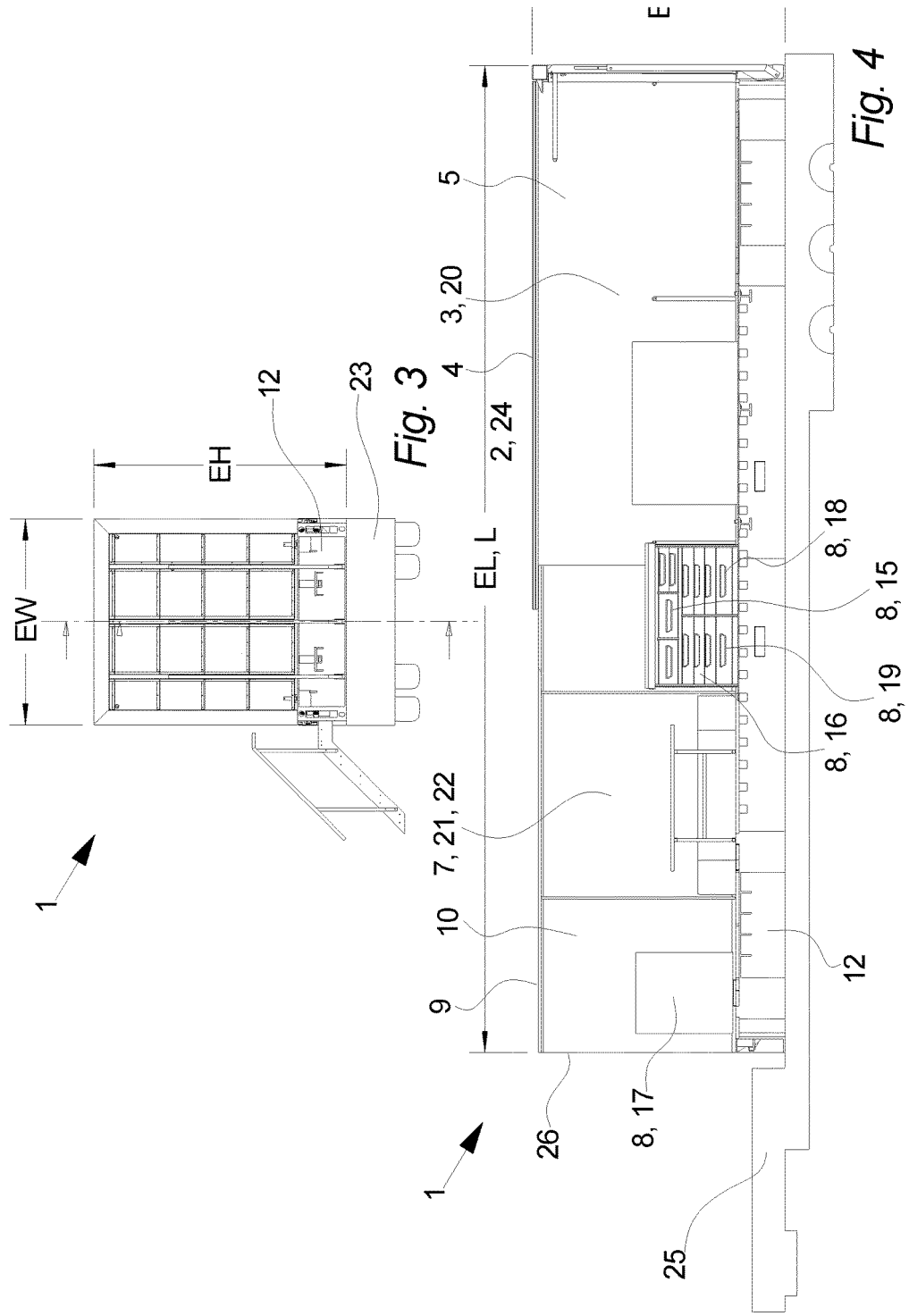

MOBILE SERVICE MODULE, A METHOD FOR SERVICING A LARGE MECHANICAL AND/OR ELECTRICAL DEVICE AND USE OF A MOBILE SERVICE MODULE

RELATED APPLICATIONS

This application is a national phase of PCT/DK2015/050153, filed on Jun. 9, 2015, which claims the benefit of Danish Application No. PA 2014 00303, filed on Jun. 9, 2014. The contents of these applications are hereby incorporated by reference.

BACKGROUND OF THE INVENTION

The invention relates to a mobile service module for servicing a large mechanical and/or electrical device, a method for servicing a large mechanical and/or electrical device having a normal place of operation above ground level and use of a mobile service module.

DESCRIPTION OF THE RELATED ART

Large mechanical and/or electrical devices—such as a wind turbine generator, a wind turbine transformer or a wind turbine gearbox—usually have to be serviced regularly or repaired occasionally. If this is not possible in situ—i.e. while the large mechanical and/or electrical device is in the place where it normally operates (e.g. in the nacelle of a wind turbine)—it is well-known in the art to dismount the large mechanical and/or electrical device and transport it to a off-site centralised service facility where the device can be serviced by means of often large and/or expensive servicing tools before it is transported all the way back to be remounted in its original place. However, the long transportation time back and forth entails a long downtime which is highly disadvantageous.

An object of the invention is therefore to provide for an advantageous technique for servicing large mechanical and/or electrical device on site.

THE INVENTION

The invention provides for a mobile service module for servicing a large mechanical and/or electrical device. The service module comprises a first area arranged to hold the large mechanical and/or electrical device, wherein the first area is at least partly enclosed by a first roof part, a first left side part and a first right side part. The service module also comprises a second area including servicing means for servicing the large mechanical and/or electrical device while located in the first area and wherein the second area is at least partly enclosed by a second roof part, a second left side part and a second right side part. The service module further comprises displacement means for displacing the first roof part and the first left side part and/or the first right side part into a position where the first roof part and the first left side part and/or the first right side part substantially cover the second roof part, the second left side part and/or the second right side part.

Forming the service module mobile is advantageous in that it enables that the servicing means can be safely moved onsite and safely used onsite in a controlled environment inside the service module. Also, the mobility enables that several large mechanical and/or electrical devices quickly can be serviced onsite thus avoiding long downtime due to long transportation times.

Furthermore, large mechanical and/or electrical devices are often so big or mounted so high that they have to be dismounted by means of a crane. However, when using a crane it is difficult to constantly control the exact position of the device and it would therefore be difficult to move the device to the first area of the service module if not at least one of the sides and the roof was completely removed from the first area. Providing the service module with displacement means enabling that at least one of the sides and the roof of the first area can be moved is therefore advantageous in that it enables a quicker positioning of the large mechanical and/or electrical device in the first area of the service module and because it reduces the risk of collision between the service module and the large mechanical and/or electrical device.

Even further, forming the first roof part and the first left side part and/or the first right side part so that they substantially cover the second roof part, the second left side part and/or the second right side part when access to the first area is open is advantageous, in that it enables that the internal measurements of the first area—when the first roof part and the first left side part and/or the first right side part are covering the first area—can be as big as possible—i.e. this design enables that bigger mechanical and/or electrical devices can be serviced in the service module.

It should be noted that the term "servicing means" in this context should be interpreted as any kind of servicing tool suitable for performing repair, maintenance or other types of service jobs on a large mechanical and/or electrical device.

It should also be noted that the term "displacement means" in this context should be interpreted as any kind of displacement device enabling that a first roof part and a first left side part and/or a first right side part can be displaced back and forth along at least part of the length of the service module.

In an aspect of the invention, said large mechanical and/or electrical device is a component lowered down to said first area from a normal place of operation above said service module.

A service module according to the present invention is particularly advantageous in relation to servicing large mechanical and/or electrical devices normally mounted some distance above ground level—such as large wind turbine components, crane components, oil rig components or other—because the present invention allows quick and easy access to the service module by means of hoisting equipment such as a crane, a winch, a towline, a crank, a pulley, a derrick, a gantry or other.

In an aspect of the invention, said first area and said second area are arranged substantially end to end on the same foundation structure.

Arranging the areas end to end enables easy access to the service means in the second area from the first area, and arranging these areas on the same foundation structure is advantageous in that it enables simple manufacturing and a strong and rigid service module.

In an aspect of the invention, said displacement means comprises guide means for guiding said first roof part and said first left side part and/or said first right side part during said displacement.

Providing the module with guide means is advantageous in that this provides for a simpler and more precise displacement.

In an aspect of the invention, said guide means substantially extends the full length of said first area and said second area.

Forming the displacement means with guide means extending substantially the full length of the first area and the second area is advantageous in that this enables proper support of the first roof part and the first left side part and/or the first right side part no matter if positioned over the first area or the second area.

It should be noted that the term "guide means" in this context should be interpreted as any kind of guide suitable for guiding the first roof part and the first left side part and/or the first right side part safely and controlled between the first area and the second area—i.e. the term includes any form of rail arrangement, track arrangement, wheel arrangement, bearing arrangement or other.

In an aspect of the invention, said guide means are at least partly formed integrally with the first area and said second area.

Forming the guide means integrally with the module—e.g. in the form of side members of the floor of the first area and second area—is advantageous in that it is a simple and inexpensive way of forming rails.

In an aspect of the invention, said servicing means is selected from a group consisting of: tools, power tools, test equipment, measuring equipment, power generating equipment, lubrication equipment, troubleshooting equipment because such tools can be difficult to move or they are sensitive making them difficult to ship by normal means.

In an aspect of the invention, said service module comprises a first compartment including said first area and a second compartment including said second area.

Forming two separate compartments in the service module is advantageous in that in that it hereby is possible to better adapt the first area and the second area to their specific function and use.

In an aspect of the invention, said second compartment comprises accommodation facilities or common room facilities.

The large mechanical and/or electrical devices are often located at distant locations and it is therefore advantageous that the second compartment comprises facilities enabling that the service personal can rest, eat and/or sleep.

In an aspect of the invention, said service module substantially has an overall shape of a rectangular parallelepiped, wherein at least some of the eight corners of said parallelepiped are provided with a twistlock fitting for stacking, locking and/or craning said service module.

Forming the service module as a rectangular parallelepiped is advantageous in that the straight lines and the many right angles makes it easier to manufacture and a rectangular parallelepiped is easy to stack and transport.

To ensure that the module can be fixated during use as a service module, during storage, during handling and during transportation it is advantageous to provide at least some of the corners (and preferably at least the bottom four corners) with a twistlock fitting. Furthermore, given the existing amount of equipment suitable for handling ISO containers etc. provided with twistlock fittings, the twistlock fitting will make handling of the modules less expensive.

By the term "twistlock fitting" is to be understood a corner locking part device arranged at at least some of the corners of the module. The twistlock fitting can have an approximate size of 7×7×4.5 inches (180×180×110 mm) and be provided with slits (which are roughly 4.1 inches (104.1 mm) long and 2.2 inches (55.9 mm) wide) so that it can act as the female part of a twistlock connector where the male component is the twistlock itself, which is fitted to e.g. a crane or transport bases. The twistlock can be inserted through the slits in the twistlock fitting where after the top portion of the twistlock (normally pointed to make insertion easier) is rotated 90° so that it cannot be withdrawn. The mechanism is the same as that of a Kensington lock, but on a much larger scale. The twistlock is also known as a Tantlinger lock. The slits can also be formed integrally with the container structure—e.g. integrally with one or more parts of the container framework.

In an aspect of the invention, the outer contour of said service module is substantially formed as a forty foot ISO container having an external length, width and height of approximately 12.192, 2.438 and 2.896 meters or as a twenty foot ISO container having an external length, width and height of approximately 6.058, 2.438 and 2.896 meters.

Forming the service module as a standardized forty or twenty foot container is advantageous in that the module then can be transported efficiently and inexpensively within the global containerized intermodal freight transport system.

An ISO container—also known as freight container, intermodal container, shipping container, hi-cube container, box, conex box or sea can—is a standardized reusable box used for the safe, efficient and secure storage and movement of materials and products within the global containerized intermodal freight transport system.

In an aspect of the invention, said first area and said second area each constitutes approximately half of the total area of said service module.

Forming the first area and the second area with approximately the same length is advantageous in that it enables the first area can be formed as big as possible substantially without having to extend the first roof part and the first left side part and/or the first right side part beyond the outer border or contour of the service module.

In an aspect of the invention, said first roof part and said first left side part and/or said first right side part are rigidly connected.

Connecting the elements to be moved between the first area and the second area rigidly to each other is advantageous in that two or more of these elements can be moved simultaneously by merely impacting one of the elements.

In an aspect of the invention, said displacement means are arranged for displacing all of said first roof part, said first left side part and said first right side part at once.

Moving both sides and the roof of the first area all at once between covering the first area and covering the second roof part, the second left side part and the second right side part is advantageous because it enables easier and more free access to the first area.

In an aspect of the invention, said first roof part and/or said second roof part are formed with a sloping outer surface.

Forming the roof parts with a sloping outer surface is advantageous in that it prevents water from building up on the roof and forming puddles that potentially can deform or damage the roof. This is particularly important in relation with the first roof part since this part has to be formed relatively thin to be able to be displaced between the first and the second area.

In an aspect of the invention, said service module further comprises a rear hatch.

Forming the service module with a rear hatch is advantageous in that it hereby is possible to easily expand the working area of the module. Furthermore the rear hatch enables easy access to the module even if the first area is covered.

In an aspect of the invention, said rear hatch is hinged along a rear bottom edge of said service module.

Hinging the rear hatch along the rear bottom edge of the module enables that when the rear hatch is opened to a horizontal state it will be substantially flush with the floor of the module—thus, making it easy to expand the usable floor area of the module.

In an aspect of the invention, said service module further comprise crane means.

The service module will always have to be used in relation with a large mechanical and/or electrical device which has to be displaced in and out of the service module. It is therefore advantageous to provide the service module with crane means to make lifting means for handling the large mechanical and/or electrical device readily available.

The invention further provides for a method for servicing a large mechanical and/or electrical device having a normal place of operation above ground level. The method comprising the steps of:

transporting a mobile service module to the place of normal operation of the large mechanical and/or electrical device,
  displacing a first roof part and a first left side part and/or a first right side part from a position in which the first roof part and the first left side part and/or the first right side part at least partly cover a first area of the service module to a position where the first roof part and the first left side part and/or the first right side part at least partly cover a second roof part, a second left side part and/or a second right side part of a second area of the service module,
  lowering the large mechanical and/or electrical device down into the first area, and
  servicing the large mechanical and/or electrical device by means of servicing means normally arranged in the second area.

Forming the service module with a dedicated area for holding the large mechanical and/or electrical device and a dedicated area for holding the service means is advantageous in that it hereby is possible to form the areas better in relation to their specific use. Furthermore, moving the cover of the first area so that it covers the cover of the second area while the large mechanical and/or electrical device is loaded into the first area is advantageous in that it enables more safe and efficient placement of the large mechanical and/or electrical device in the first area substantially without the cover parts of the first area takes up any space while not in place over the first area.

In an aspect of the invention, said method further comprises the step of displacing said first roof part and said first left side part and/or said first right side part back into position above said first area before or at least while said large mechanical and/or electrical device is being serviced.

Moving the first roof part and the first left side part and/or the first right side part back to cover the first area when it contains the large mechanical and/or electrical device is advantageous in that it enables that the large mechanical and/or electrical device can be serviced in a more controlled environment and it protects the large mechanical and/or electrical device, the service means and the personnel from the general fury of the elements.

In an aspect of the invention, said first roof part and said first left side part and/or said first right side part is moved manually.

Displacing the first roof part and the first left side part and/or the first right side part manually is advantageous in that is simple, efficient and inexpensive.

In an aspect of the invention, the method is a method for servicing a large mechanical and/or electrical device by means of a mobile service module according to any of the previously mentioned mobile service modules.

Even further, the invention provides for use of a mobile service module according to any of the previously mentioned mobile service modules for onsite service of large wind turbine components, such as a wind turbine generator, a wind turbine transformer or a wind turbine gearbox.

Using the present invention for servicing large wind turbine components is advantageous in that wind turbine components have to be hoisted down from the nacelle, the components are often very specialized and complex and wind turbines are often arranged in parks making it more profitable to move a service module on site to service more wind turbines in one haul.

FIGURES

Figure 6:
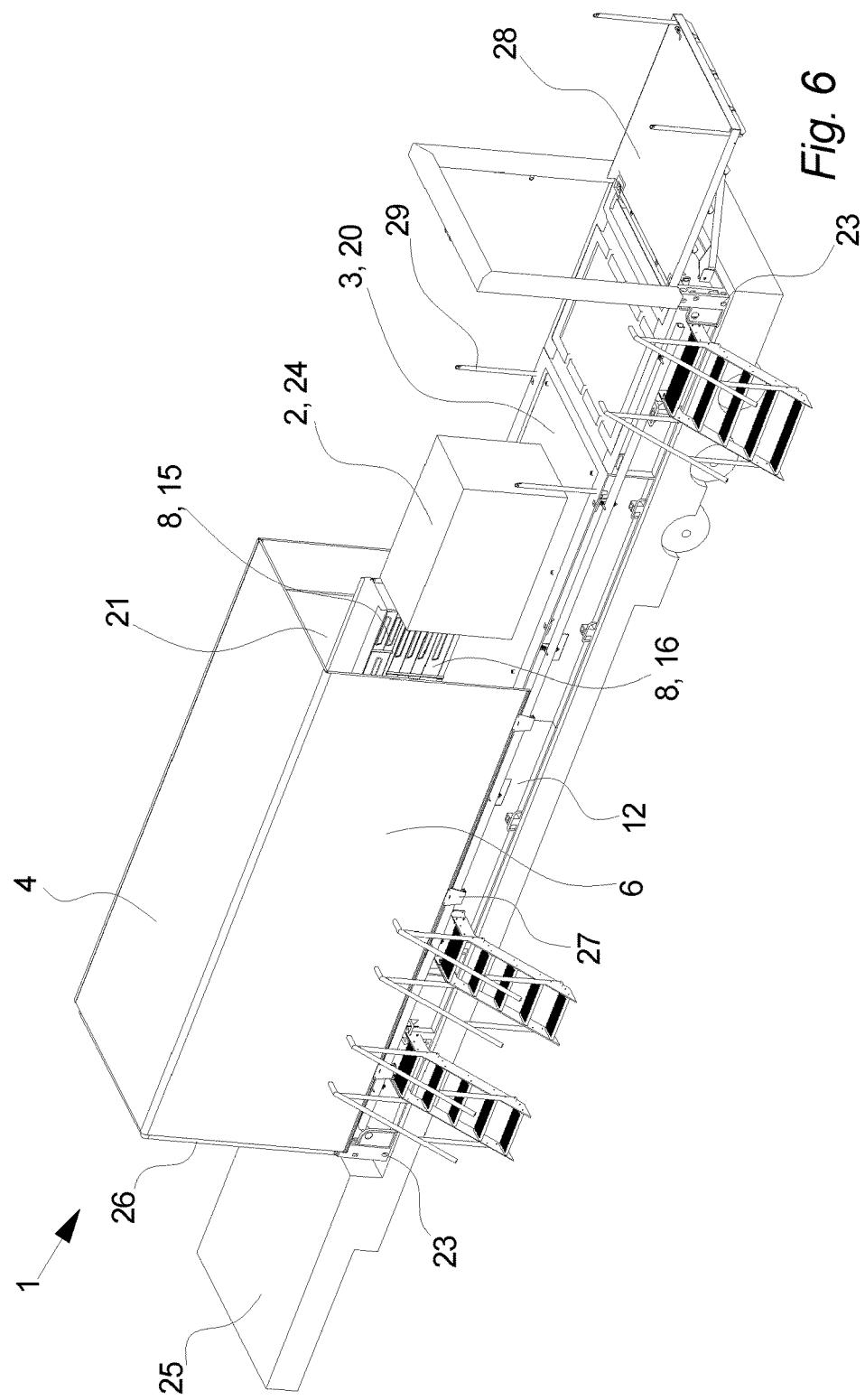

The invention will be described in the following with reference to the figures in which FIG. 1 illustrates a mobile service module in a closed state, as seen from the side, FIG. 2 illustrates a mobile service module in an open state, as seen from the side, FIG. 3 illustrates a mobile service module, as seen from the rear, FIG. 4 illustrates a cross section through the middle of a mobile service module in closed state, as seen from the side, FIG. 5 illustrates a mobile service module in a closed state, as seen in perspective, and FIG. 6 illustrates a mobile service module in an open state, as seen in perspective.

DETAILED DESCRIPTION OF THE INVENTION

FIG. 1 illustrates a mobile service module in a closed state, as seen from the side and FIG. 2 illustrates a mobile service module 1 in an open state, as seen from the side.

In this embodiment and in the embodiment disclosed in all the other figures the service module 1 is placed on a trailer 25 enabling that the module 1 easily can be moved by means of a truck (not shown). However, in another embodiment the service module 1 could be placed directly on the ground, the service module 1 could be placed on some other vehicle enabling a high degree of mobility or the service module itself could comprise some kind of mobility means (not shown) enabling that the service module 1 could be easily moved—such as wheels—or even propelling means (not shown) enabling that the service module 1 could be self-propelled. I.e. in another embodiment the service module 1 could be formed more or less integrally with the trailer 25.

FIG. 3 illustrates a mobile service module 1, as seen from the rear and FIG. 4 illustrates a cross section through the middle of a mobile service module 1 in closed state, as seen from the side.

In this embodiment of the invention the first area 3 forms part of a first compartment 20 in which the large mechanical and/or electrical device 2 is serviced and in this embodiment the second area 7 includes a second compartment 21 which in this embodiment is formed as common room facilities 22. In this embodiment the second area also comprises a room in which servicing means 8 in the form of power generating equipment 17 is placed. The power generating equipment 17 generates power to the common room facilities 22 and power to the first area 3—particularly power tools, troubleshooting equipment, lubrication equipment and other equipment used for servicing the large mechanical and/or electrical device 2 in the first area 3. The power generating equipment 17 can also be used for supplying electrical power externally—e.g. during repair or maintenance of a wind turbine—where the wind turbine is off-grid—the power generating equipment 17 can be used for powering internal components of the wind turbine, such as an elevator, heating means, service cranes and other.

However, in another embodiment the mobile service module 1 would be provided with means for being supplied with electrical power from an external power source.

Also, in another embodiment at least some of the servicing means 8 could be located in the first area 3, in the foundation structure 12 or elsewhere in or on the service module 1.

Also, in another embodiment particularly the second area 7 could be arranged differently—i.e. the second area 7 could comprise other functionalities such as sleeping facilities, toilet facilities, storeroom facilities (e.g. for spare parts) or other facilities or the second area 7 could comprise different equipment such as beds, toilets, compressors, test stations, refrigerators, freezers or other.

In an embodiment the first area 3 an/or the second area 7 could comprise crane means (not shown) either arranged to move tools and/or the large mechanical and/or electrical device 2 around inside the module 1 or to aid in moving the large mechanical and/or electrical device 2 in and out of the module 1. I.e. in an embodiment the first area 3 could further comprise crane means in the form of a winch or a tackle e.g. connected to the foundation structure 12 to be used when hoisting e.g. a wind turbine generator down from a nacelle and onto the module 1. Or the module 1 could comprise crane means in the form of a loader crane e.g. arranged to lift a moto out of a boat and onto the first area 3.

In this embodiment the roof and side parts 4, 5, 6, 9, 10, 11 overlap slightly when the first parts 4, 5, 6 are in closed position. However, since the second roof part 9, the second left side part 10 and the second right side part 11 is stationary the first area 3 is defined by the area not covered by the second roof part 9, the second left side part 10 and the second area 7 is defined as the area covered by second roof part 9, the second left side part 10—given the fact that the size of the space available to position a large mechanical and/or electrical device 2 is limited by the second roof part 9, the second left side part 10 and the second right side part 11 no matter how far towards the second area 7 the first roof part 4, the first left side part 5 and the first right side part 6 is displaced.

In this embodiment the large mechanical and/or electrical device 2 is a wind turbine generator 24 located in one end of the first area 3. In another embodiment the large mechanical and/or electrical device 2 could be another type of device, it could take up more space in the first area 3 and/or it could be positioned differently in the first area 3.

In another embodiment the mobile service module 1 could be used in relation with other technical areas than wind turbines—such as onsite repair or maintenance of ships, airplanes, building cranes or other.

In this embodiment the first area 3 and the second area 7 share the same foundation structure 12 but in another embodiment the areas 3, 7 could be arranged on separate foundation structures 12.

FIG. 5 illustrates a mobile service module 1 in a closed state, as seen in perspective and FIG. 6 illustrates a mobile service module 1 in an open state, as seen in perspective.

In this embodiment of the invention the first area 3 is at least partly enclosed by a first roof part 4, a first left side part 5 and a first right side part 6 which are all displaceable so that they may be moved from the position shown in FIG. 5—i.e. from the closed position in which they cover the first area 3—to the open position shown in FIG. 6.

In this embodiment the second area 7 is at least partly enclosed by a second roof part 9, a second left side part 10 and a second right side part 11, wherein all these parts 9, 10, 11 are stationary and wherein the term "at least partly enclosed" refers to the fact that the second roof part 9, the second left side part 10 and the second right side part 11 does not fully enclose the second area 7—i.e. e.g. the front end 26 and at least part of the foundation structure 12 also at least partly encloses the second area 7.

In this embodiment the service module 1 comprises displacement means 13 enabling that the first roof part 4, the first left side part 5 and the first right side part 6 may easily be displaced between an open and a closed position. In this embodiment the displacement means 13 comprises guide means 14 substantially extending the full length L of the service module 1 and being connected to either sides of the foundation structure 12 of the service module 1. In this embodiment the displacement means 13 also comprises wheel arrangements 27 connected to the first left side part 5 and the first right side part 6, respectively, and engaging the guide means 14 so that the first roof part 4, the first left side part 5 and the first right side part 6 may easily be displaced. However, it is obvious to the skilled person that in another embodiment the displacement means 13 could be formed in many other ways e.g. by providing the sides 5, 6 with wheels running directly on top of the foundation structure 12, by using no wheels but simply drag the first parts 4, 5, 6 back and forth or some other way.

However, the present embodiment of the displacement means 13 enables that the first roof part 4, the first left side part 5 and the first right side part 6 is moved back and forth manually. In another embodiment the displacement means could comprise drive means for automatic displacement of the first parts 4, 5, 6. Such drive means could e.g. comprise a rack and pinion arrangement, a linear actuator arrangement, a motor drive or other.

Also, in another embodiment the guide means 14 could extent less that substantially the full length L of service module 1 if the wheel arrangements 27 on the side parts 5, 6 was arranged differently, if a smaller first area 3 was sufficient or if the guide means 14 could extent longer that substantially the full length L of service module 1 e.g. if it was necessary that the first roof and side parts 4, 5, 6 was moved beyond the outer extend of the service module 1.

Also, in another embodiment the service module 1 could be formed integrally with a trailer 25 (to be pulled by a truck) and in such an embodiment the guide means 14 could be formed integrally with the trailer 25—e.g. by using the side member of the trailer 25 as rails.

In this embodiment the first roof part 4, the first left side part 5 and the first right side part 6 are all rigidly connected so that when one of these parts 4, 5, 6 is moved, all of the parts 4, 5, 6 will move simultaneously.

However, in another embodiment of the invention one of the first left side part 5 and the first right side part 6 would be stationary and only the first roof part 4 the other of the first left side part 5 and the first right side part 6 would be connected to the displacement means 13—i.e. in such an embodiment only one of the sides 5, 6 of the first area 3 and the first roof part 4 would be displaceable.

In an embodiment the rear hatch 28 can be opened by means of hydraulics. In the open state shown in FIG. 6 the rear hatch 28 could form part of the first area 3 particularly if the first roof and side parts 4, 5, 6 was formed so long that they were able to extend out over the rear hatch 28 when in open position.

In this embodiment both the first roof part 4 and the second roof part 9 are flat but in another embodiment one or both could be formed with a gradient either in the form of the roof 4, 9 sloping to one side or the roof 4, 9 being highest at the middle and then sloping downwards towards to both sides.

In the embodiment disclosed in FIG. 6 the first area 3 and the rear hatch 28 is further provided with rail posts 29 so that a rail may be formed around the first area 3 and the rear hatch 28 e.g. by suspending a rope, a wire or bars between the posts 29. The rail posts 29 are preferably removable so that the rail removed when the module is not in use. O the rail could be permanently installed or it could be made foldable so that it could be functional when the first roof part 4, the first left side part 5 and the first right side part 6 are displaced away from the first area 3 and/or the rear hatch 28.

In this embodiment the service module 1 basically comprises a forty foot flat rack ISO container on which the first and the second areas 3, 7 and their appertaining roof and side parts 4, 5, 6, 9, 10, 11 has been arranged. However, in another embodiment the starting point could be another type of ISO container, another size of ISO container, a dedicated structure or framework, interconnected modules, the service module 1 could be formed by separate and/or common modules either interconnected or connected to a common framework or any combination thereof.

No matter how the mobile service module 1 is formed it is advantageous if at least some of the corners are provided with a twistlock fitting 23 enabling that the service module 1 easily many be handled by standardised ISO container handling means during e.g. manufacturing, storage and transportation of the mobile service module 1. In an embodiment all eight corners would be provided with twistlock fittings 23 but in this embodiment only the bottom corners are provided with twistlock fittings 23. In this embodiment the twistlock fitting 23 are formed integrally with the foundation structure 12 i.e. in this embodiment the twistlock fitting 23 are merely standardised slits cut in the existing structure but in another embodiment the twistlock fitting 23 could be separate parts welded or bolted to the container structure.

The invention has been exemplified above with reference to specific examples of designs and embodiments of service modules 1, mechanical and/or electrical devices 2, displacement means 13 etc. However, it should be understood that the invention is not limited to the particular examples described above but may be designed and altered in a multitude of varieties within the scope of the invention as specified in the claims.

LIST

1. Mobile service module
2. Large mechanical and/or electrical device
3. First area
4. First roof part
5. First left side part
6. First right side part
7. Second area
8. Servicing means
9. Second roof part
10. Second left side part
11. Second right side part
12. Foundation structure
13. Displacement means
14. Guide means
15. Test equipment
16. Measuring equipment
17. Power generating equipment
18. Lubrication equipment
19. Troubleshooting equipment
20. First compartment
21. Second compartment
22. Common room facilities
23. Twistlock fitting
24. Wind turbine generator
25. Trailer
26. Front end
27. Wheel arrangement
28. Rear hatch
29. Rail post
EL. External length of container
EW. External width of container
EH. External height of container
L. Length of first area and second area

The invention claimed is:

1. A mobile service module for servicing a mechanical and/or electrical device, said service module comprises
   a first area arranged to hold said mechanical and/or electrical device, wherein said first area is at least partly enclosed by a first roof part, a first left side part and a first right side part,
   said service module comprising a second area including a servicing tool for servicing said mechanical and/or electrical device while located in said first area and wherein said second area is at least partly enclosed by a second roof part, a second left side part and a second right side part, and
   wherein said service module further comprises a displacement device to displace said first roof part and said first left side part and/or said first right side part into a position where said first roof part and said first left side part and/or said first right side part substantially covers said second roof part, said second left side part and/or said second right side part, and
   wherein said service module comprises a first compartment including said first area and a second compartment including said second area, and
   wherein said second compartment comprises accommodation facilities or common room facilities.

2. A mobile service module according to claim 1, wherein said mechanical and/or electrical device is a component lowered down to said first area from a normal place of operation above said service module.

3. A mobile service module according to claim 1, wherein said first area and said second area are arranged substantially end to end on a same foundation structure.

4. A mobile service module according to claim 1, wherein said displacement device comprises a guide for guiding said first roof part and said first left side part and/or said first right side part during said displacement.

5. A mobile service module according to claim 4, wherein said guide substantially extends the full length of said first area and said second area.

6. A mobile service module according to claim 4, wherein said guide are at least partly formed integrally with the first area and said second area.

7. A mobile service module according to claim 1, wherein said servicing tool is selected from a group consisting of:

power tools, test equipment, measuring equipment, power generating equipment, lubrication equipment, troubleshooting equipment.

8. A mobile service module according to claim 1, wherein said service module substantially has an overall shape of a rectangular parallelepiped, wherein at least some of the eight corners of said parallelepiped are provided with a twistlock fitting for stacking, locking and/or craning said service module.

9. A mobile service module according to claim 1, wherein the outer contour of said service module is substantially formed as a forty foot ISO container having an external length, width and height of approximately 12.192, 2.438 and 2.896 meters or as a twenty foot ISO container having an external length, width and height of approximately 6.058, 2.438 and 2.896 meters.

10. A mobile service module according to claim 1, wherein said first area and said second area each constitutes approximately half of the total area of said service module.

11. A mobile service module according to claim 1, wherein said first roof part and said first left side part and/or said first right side part are rigidly connected.

12. A mobile service module according to claim 1, wherein said first roof part and/or said second roof part are formed with a sloping outer surface.

13. A mobile service module according to claim 1, wherein said service module further comprises a rear hatch.

14. A mobile service module according to claim 13, wherein said rear hatch is hinged along a rear bottom edge of said service module.

15. A mobile service module according to claim 13, wherein said service module further comprise crane means.

16. A method for servicing a mechanical and/or electrical device having a normal place of operation above ground level, where the servicing is performed by means of a mobile service module according to claim 1, said method comprising the steps of:
  transporting the mobile service module to the place of normal operation of said mechanical and/or electrical device,
  displacing the first roof part and the first left side part and/or the first right side part from a position in which said first roof part and said first left side part and/or said first right side part at least partly cover the first area of said service module to a position where said first roof part and said first left side part and/or said first right side part at least partly cover the second roof part, the second left side part and/or the second right side part of the second area of said service module,
  lowering said mechanical and/or electrical device down into said first area, and
  servicing said mechanical and/or electrical device by means of the servicing tool normally arranged in said second area.

17. A method according to claim 16, wherein said method further comprises the step of displacing said first roof part and said first left side part and/or said first right side part back into position above said first area before or at least while said mechanical and/or electrical device is being serviced.

18. A method according to claim 16, wherein said first roof part and said first left side part and/or said first right side part are displaced manually.

19. Use of a mobile service module according to claim 1 for onsite service of wind turbine components, such as a wind turbine generator, a wind turbine transformer or a wind turbine gearbox.

* * * * *